United States Patent
Karakas

(10) Patent No.: US 10,747,831 B1
(45) Date of Patent: *Aug. 18, 2020

(54) SYSTEM AND METHOD FOR MACHINE LEARNING SYSTEM INITIALIZATION

(71) Applicant: introduce.social Inc., Palo Alto, CA (US)

(72) Inventor: Ahmet Karakas, Palo Alto, CA (US)

(73) Assignee: shallow.AI Inc., Los Altos, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/612,633

(22) Filed: Jun. 2, 2017

Related U.S. Application Data

(60) Provisional application No. 62/344,946, filed on Jun. 2, 2016, provisional application No. 62/344,938, filed on Jun. 2, 2016.

(51) Int. Cl.
- *G06F 16/00* (2019.01)
- *G06F 16/9535* (2019.01)
- *G06F 7/08* (2006.01)

(52) U.S. Cl.
CPC ............ *G06F 16/9535* (2019.01); *G06F 7/08* (2013.01)

(58) Field of Classification Search
CPC .............. G06F 16/9535; G06F 16/958; G06F 16/9024; G06F 17/30241; G06F 17/3087; G06F 17/30321; G06F 17/30333; G06F 17/30607; G06Q 50/01

See application file for complete search history.

(56) References Cited

U.S. PATENT DOCUMENTS

| | | | |
|---|---|---|---|
| 8,775,517 B1 * | 7/2014 | Goldman | G06F 16/9535 709/204 |
| 8,788,541 B1 * | 7/2014 | Goldman | H04L 12/1813 707/802 |
| 9,026,524 B1 | 5/2015 | Goldman et al. | |
| 9,811,866 B1 * | 11/2017 | Goldman | G06Q 50/01 |
| 2012/0215865 A1 | 8/2012 | Sack et al. | |
| 2013/0159519 A1 | 6/2013 | Hochberg et al. | |
| 2014/0189530 A1 * | 7/2014 | Anand | H04L 65/403 715/753 |
| 2014/0279034 A1 * | 9/2014 | Samuel | H04L 67/22 705/14.64 |
| 2017/0185601 A1 * | 6/2017 | Qin | G06F 16/24578 |

* cited by examiner

*Primary Examiner* — Belix M Ortiz Ditren
*Assistant Examiner* — Suman Rajaputra
(74) *Attorney, Agent, or Firm* — Aka Chan LLP

(57) ABSTRACT

A system and method for recommendation engine initialization and new user characterization. An implementation of the platform is a mobile application.

17 Claims, 6 Drawing Sheets

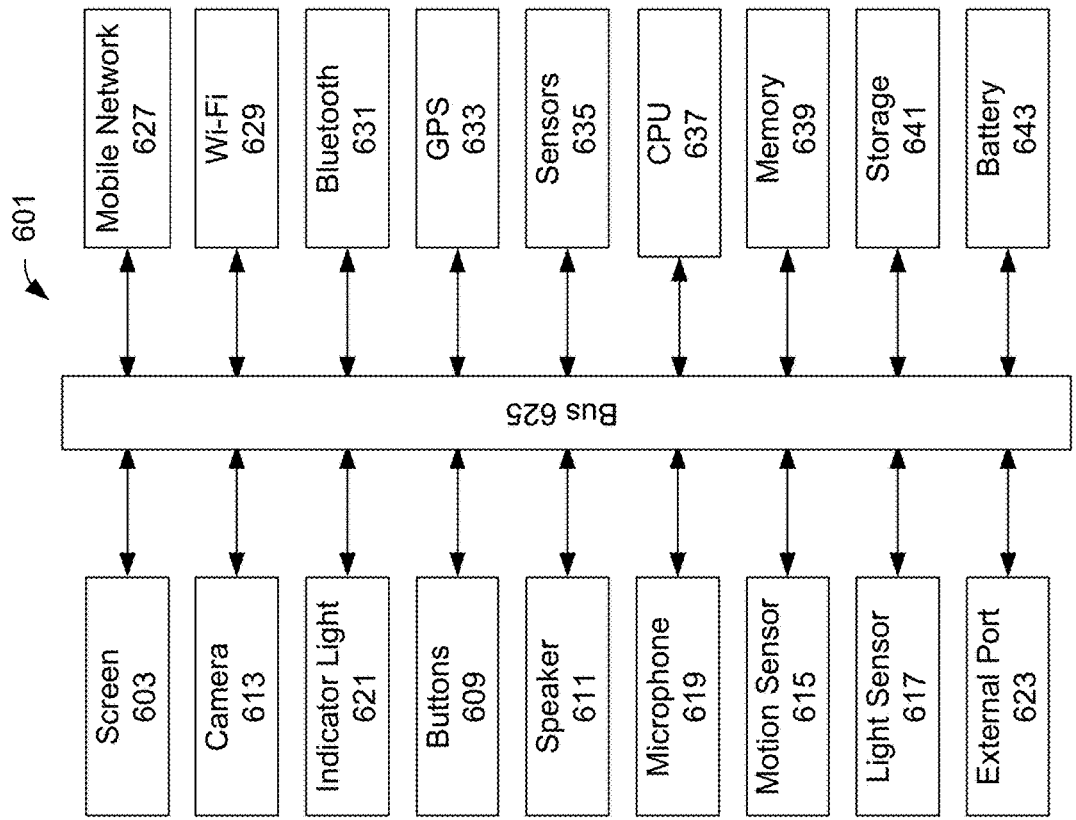
Figure 6
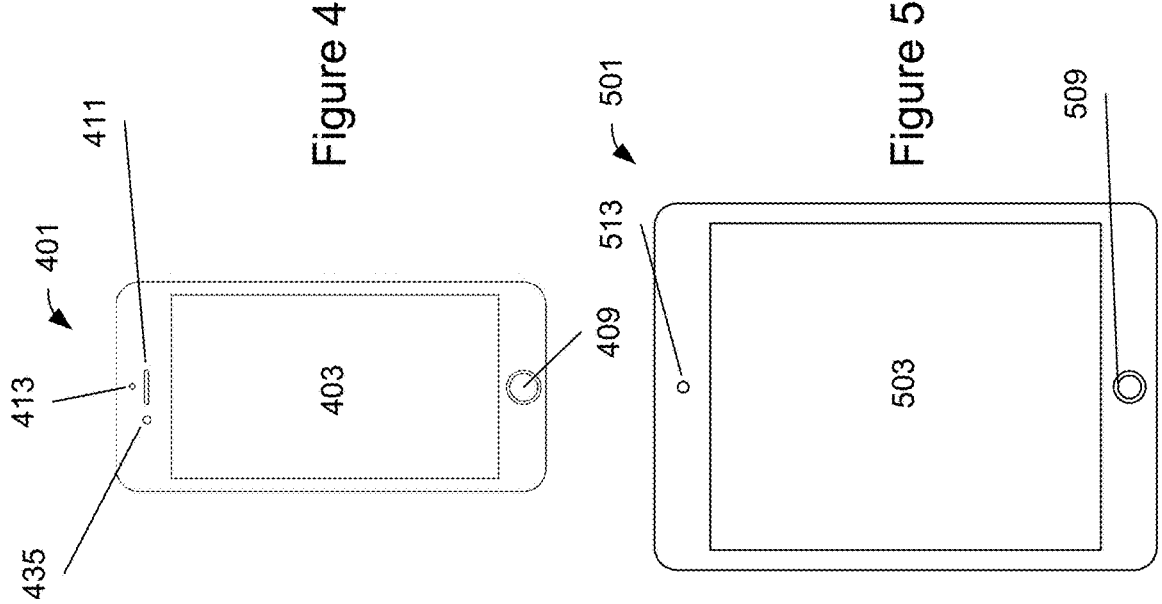
Figure 4
Figure 5

SYSTEM AND METHOD FOR MACHINE LEARNING SYSTEM INITIALIZATION

CROSS-REFERENCE TO RELATED APPLICATIONS

This patent application claims the benefit of U.S. patent applications 62/344,938 and 62/344,946, filed Jun. 2, 2016, which are incorporated by reference along with all other references cited in this application.

BACKGROUND OF THE INVENTION

The present invention relates to the field of software and information management, and more specifically, to social networking.

Social networks track and enable online connections between users. Typical social networking systems allow users to associate themselves with other users to create a network of connections among the users of the social networking system.

Despite the success of existing social networks, there is a need for improved social networking and software techniques.

BRIEF SUMMARY OF THE INVENTION

A system and method for recommendation engine initialization and new user characterization. An implementation of the platform is a mobile application.

In an implementation, a method includes: providing a social graph, where the social graph includes: a first type of node, referred to as a user-provided node, a first type of edge, referred to as a user-provided edge; and a second type of edge, referred to as a system-provided edge. The method includes: using at least one electronic processor, managing the social graph including: creating a user-provided node for each user of a system including the social graph; allowing a first user-provided node for a first user to become connected a second user-provided node for a second user via a first user-provided edge; allowing the first and second users to view the first user-provided edge; allowing the first user-provided node to become connected a third user-provided node for a third user via a first system-provided edge; disallowing the first and third users to being able to view the first system-provided edge; displaying to the first user others users that are connected to the first user via user-provided edges but not system-provided edges; designating the first and third user-provided nodes as being in a first colony group of the social graph; creating a new user-provided node for new user of a system including the social graph, where the new user-provided node is not connected to any system-provided edges; delivering a representative content for the first colony group and monitoring a reaction of the new user to the representative content; when the reaction is positive, determining the new user-provided node should belong to the first colony group; and adding to the new user-provided node to the first colony group by connecting the new user-provided node by the a system-provided edge to other user-provided nodes already in the first colony group.

In various implementations, via the first user-provided edge, the first user-provided node is separated by one degree of separation from the second user-provided node. The managing the social graph can include: allowing the second user-provided node to become connected a fourth user-provided node for a fourth user via a first and second user-provided edges, where via the second user-provided edge, the first user-provided node is separated by two degrees of separation from the fourth user-provided node.

The method can include: delivering a first informational content to a first colony group of the social graph, where the first colony group includes user-provided nodes connected together via the first system-provided edge, which includes the first and third user-provided nodes. The method can include: disallowing delivering of the first informational content to the second user-provided node, which is not connected to the first system-provided edge.

Managing the social graph can include: allowing the second user-provided node to become connected a fourth user-provided node for a fourth user via a second system-provided edge. The method can include: delivering a first informational content to a first colony group of the social graph, where the first colony group includes user-provided nodes connected together via the first system-provided edge, which includes the first and third user-provided nodes; and delivering a second informational content to a second colony group of the social graph, where the second colony group includes user-provided nodes connected together via the second system-provided edge, which includes the second and fourth user-provided nodes.

In various implementations, the first informational content is not delivered to the fourth user-provided node, and the second informational content is not delivered to the third user-provided node. The system creates the first user-provided edge because the first user indicated a connection to the second user. The system creates the first system-provided edge although the first user had not indicated any connection to the third user. The system creates the first system-provided edge although the first user had not indicated any connection to the third user.

The method can include: determining the new user-provided node in the first colony group should no longer belong to the first colony group; and removing the new user-provided node from the first colony group by removing system-provided edges representative of the first colony group from connecting to the new user-provided node that are to be removed.

In an implementation, a system includes: a first mobile phone, where the first mobile phone includes a touchscreen and a wireless transceiver; a software application program, including code executable on a processor of the first mobile phone. The software application program include: code to cause the wireless transceiver to connect and access to a social network. The social network includes: a first type of node, referred to as a user-provided node, a first type of edge, referred to as a user-provided edge; and a second type of edge, referred to as a system-provided edge. The social network is managed including: creating a user-provided node for each user of a system including the social graph; allowing a first user-provided node for a first user to become connected a second user-provided node for a second user via a first user-provided edge; allowing the first and second users to view the first user-provided edge; allowing the first user-provided node to become connected a third user-provided node for a third user via a first system-provided edge; disallowing the first and third users to being able to view the first system-provided edge; designating the first and third user-provided nodes as being in a first colony group of the social graph; creating a new user-provided node for new user of a system comprising the social graph, where the new user-provided node is not coupled to any system-provided edges; delivering a representative content for the first colony group and monitoring a reaction of the new user to the representative content; when the reaction is positive, determining the new user-provided node should belong to the first colony group; and adding to the new user-provided node to the first colony group by connecting new user-provided node by the a system-provided edge to other user-provided nodes already in the first colony group.

The system includes: code to generate a first touch interactive screen for a first user of the first mobile phone a picture of second user of a social network, where the second user is connected to the first user via a system-provided edge; code to generate a second touch interactive screen for the first user of the first mobile phone a picture of third user of a social network, where the third user is connected to the first user via a user-provided edge; code to generate a third touch interactive screen to allow the first user to select from a list of system-generated ice breaker questions to send to the second user; and code to generate a fourth touch interactive screen to the first user to start a party and invite one or more others users of the social network to the party.

In various implementations, the system includes: a second mobile phone, where the second mobile phone includes a touchscreen and a wireless transceiver; a software application program, including code executable on a processor of the second mobile phone. The software application program includes: code to generate a fourth touch interactive screen to a third user of the second mobile phone including a first informational content for a first colony group of the social graph, where the first colony group includes user-provided nodes connected together via the first system-provided edge, which includes the first and third user-provided nodes.

The system creates the first system-provided edge although the first user had not indicated any connection to the third user. The system creates the first user-provided edge because the first user indicated a connection to the second user. The social network is managed including: determining the new user-provided node in the first colony group should no longer belong to the first colony group; and removing the new user-provided node from the first colony group by removing system-provided edges representative of the first colony group from connecting to the new user-provided node that is to be removed.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 4-5 show examples of mobile devices, which can be mobile clients.

FIG. 6 shows a system block diagram of mobile device.

DETAILED DESCRIPTION OF THE INVENTION

Figure 1:
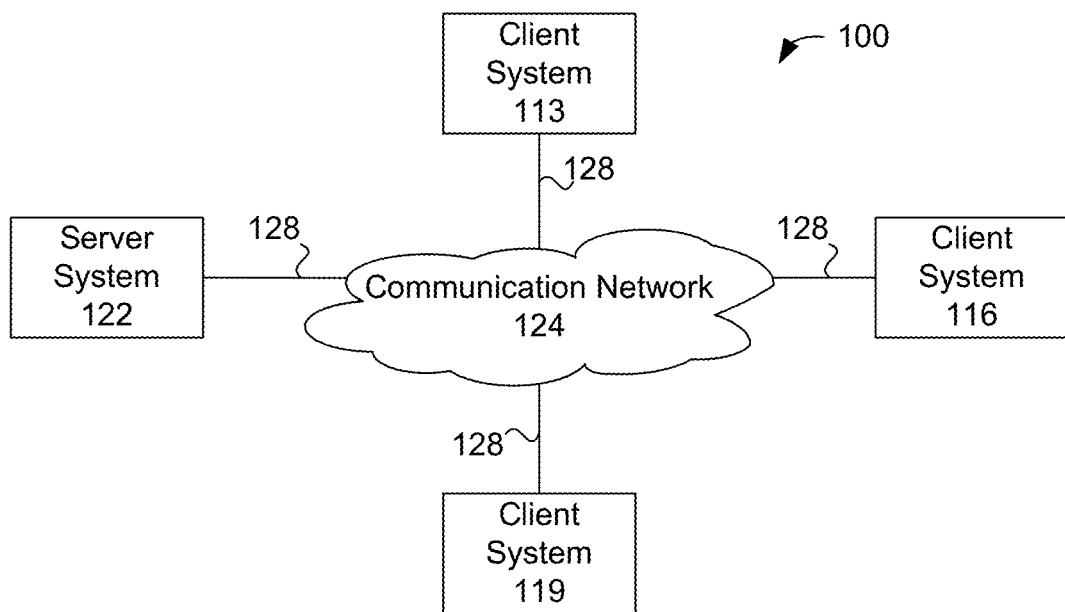
FIG. 1 shows a simplified block diagram of a client-server system and network in which an embodiment of the invention may be implemented.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a standalone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
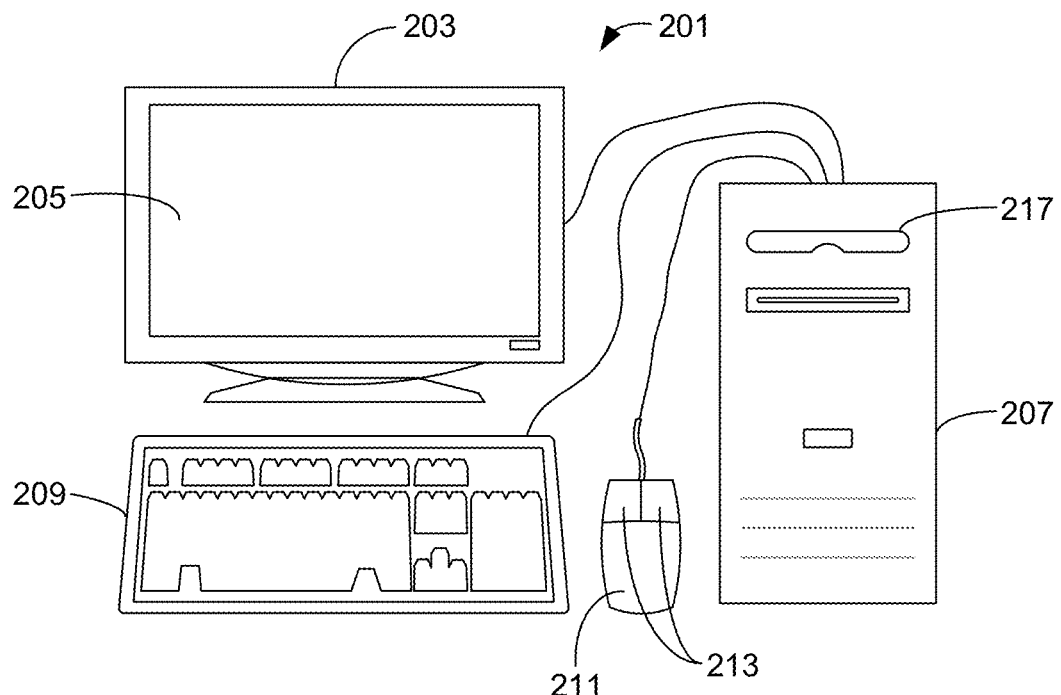
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
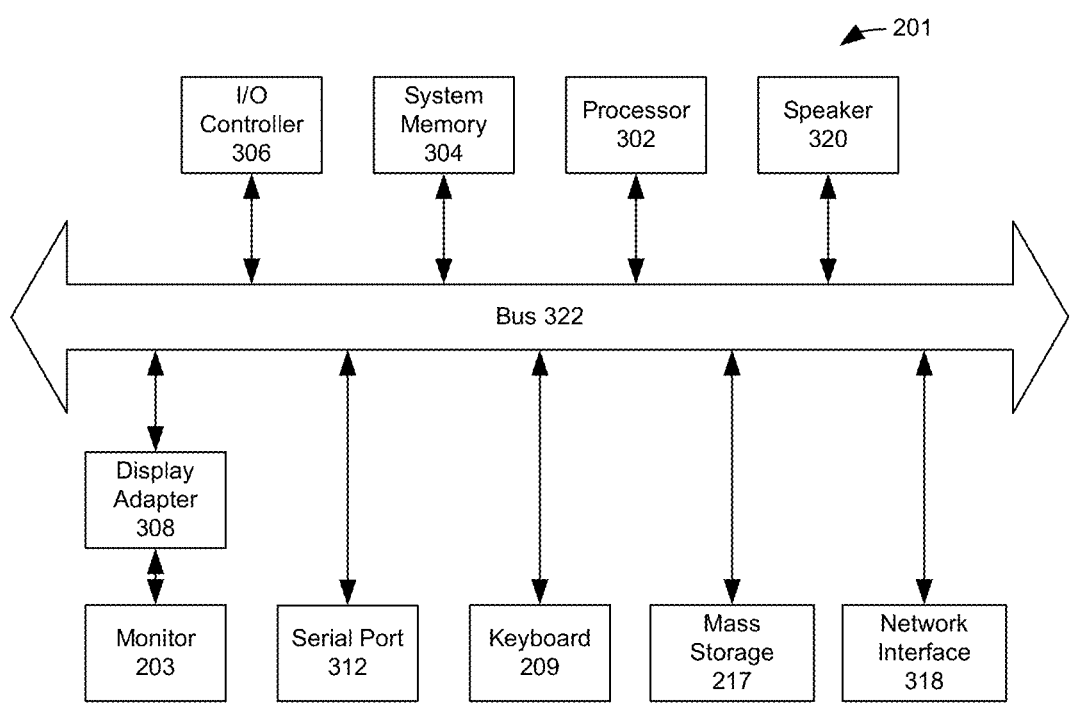
FIG. 3 shows a system block diagram of a client computer system used to execute application programs such as a web browser or tools.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

FIGS. 4-5 show examples of mobile devices, which can be mobile clients. Mobile devices are specific implementations of a computer, such as described above. FIG. 4 shows a smartphone device 401, and FIG. 5 shows a tablet device 501. Some examples of smartphones include the Apple iPhone, Samsung Galaxy, and Google Nexus family of devices. Some examples of tablet devices include the Apple iPad, Samsung Galaxy Tab, and Google Nexus family of devices.

Smartphone 401 has an enclosure that includes a screen 403, button 409, speaker 411, camera 413, and proximity sensor 435. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 409 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 501 is similar to a smartphone. Tablet 501 has an enclosure that includes a screen 503, button 509, and camera 513. Typically the screen (e.g., touch screen) of a tablet is larger than a smartphone, usually 7, 8, 9, 10, 12, 13, or more inches (measured diagonally).

FIG. 6 shows a system block diagram of mobile device 601 used to execute the software of the present invention. This block diagram is representative of the components of smartphone or tablet device. The mobile device system includes a screen 603 (e.g., touch screen), buttons 609, speaker 611, camera 613, motion sensor 615, light sensor 617, microphone 619, indicator light 621, and external port 623 (e.g., USB port or Apple Lightning port). These components can communicate with each other via a bus 625.

The system includes wireless components such as a mobile network connection 627 (e.g., mobile telephone or mobile data), Wi-Fi 629, Bluetooth 631, GPS 633 (e.g., detect GPS positioning), other sensors 635 such as a proximity sensor, CPU 637, RAM memory 639, storage 641 (e.g., nonvolatile memory), and battery 643 (e.g., lithium ion or lithium polymer cell). The battery supplies power to the electronic components and is rechargeable, which allows the system to be mobile.

U.S. patent application Ser. Nos. 15/612,546, 15/612,587, 15/612,603, and 15/612,655, filed Jun. 2, 2017, are incorporated by reference.

We present a system and method that identifies likeminded users and allows them to 1. generate, spread and share content in computing platforms, 2. communicate among each other where, content is a piece of information such as text, image, video, audio, URL link.

computing platforms can be classified into two categories: mobile and stationary platforms.

Mobile computing platforms: are handheld computing devices, typically having a display screen with a touch input or keyboard, or any combination. They have an operating system (OS) and can run various types of application software, also known as App. Most handheld devices can be equipped with WiFi, Bluetooth, GPS and RF capabilities that allow connections to cellular networks, the Internet or other devices for voice or data communication. Smartphones, PDAs, tablet computers, wearable computers such as smart watches, laptop computers, personal navigation devices and cameras are some of the popular examples.

Stationary computing platforms: include servers, mainframe and supercomputers and desktop computers. Typically these platforms have great computing power, therefore, requiring significant electric power to operate. Therefore, their physical sizes or power requirements, or a combination, prevent them from being a mobile device. Servers operate within a client-server architecture. The server part is a system that responds to requests across a computer network to provide a service. The client is the component that generates the requests. The clients typically connect to the server through the network but may also run on the same computer. Another typical arrangement is peer-to-peer networking that enables all computers to act as either a server or client as needed.

The CSE—Content Spreading Engine Description

We present a content spreading tool that works in mobile or stationary computers, or any combination. The software program, or the app in mobile platforms, spreads contents using a unique algorithm that utilizes several parameters such as the influence region of the author, location, like-minded users in a colony, social graph, discovery and virality.

The author is the person who originates the content.

The reader is the person who receives the content.

The colony is the group users belong in, based on several parameters such as their social connections, preferences, tastes, as well as location. The size of a colony varies as users join/leave and one user may belong to several different colonies, depending on the content.

location: the geographic region user lives in.

When content reaches a reader, he or she has an option to ignore or spread this content to others.

Figure 7:
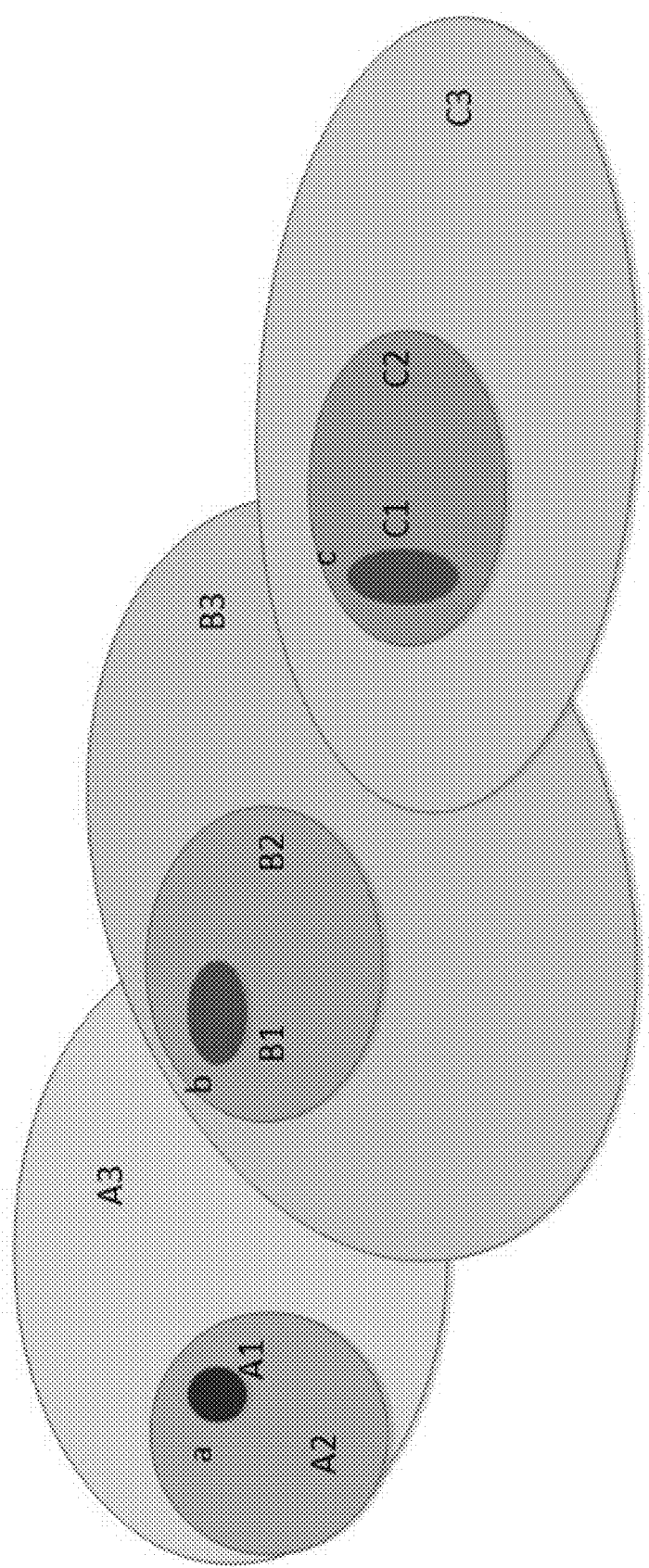
FIG. 7 shows a typical message spreading flow.
Figure 8:
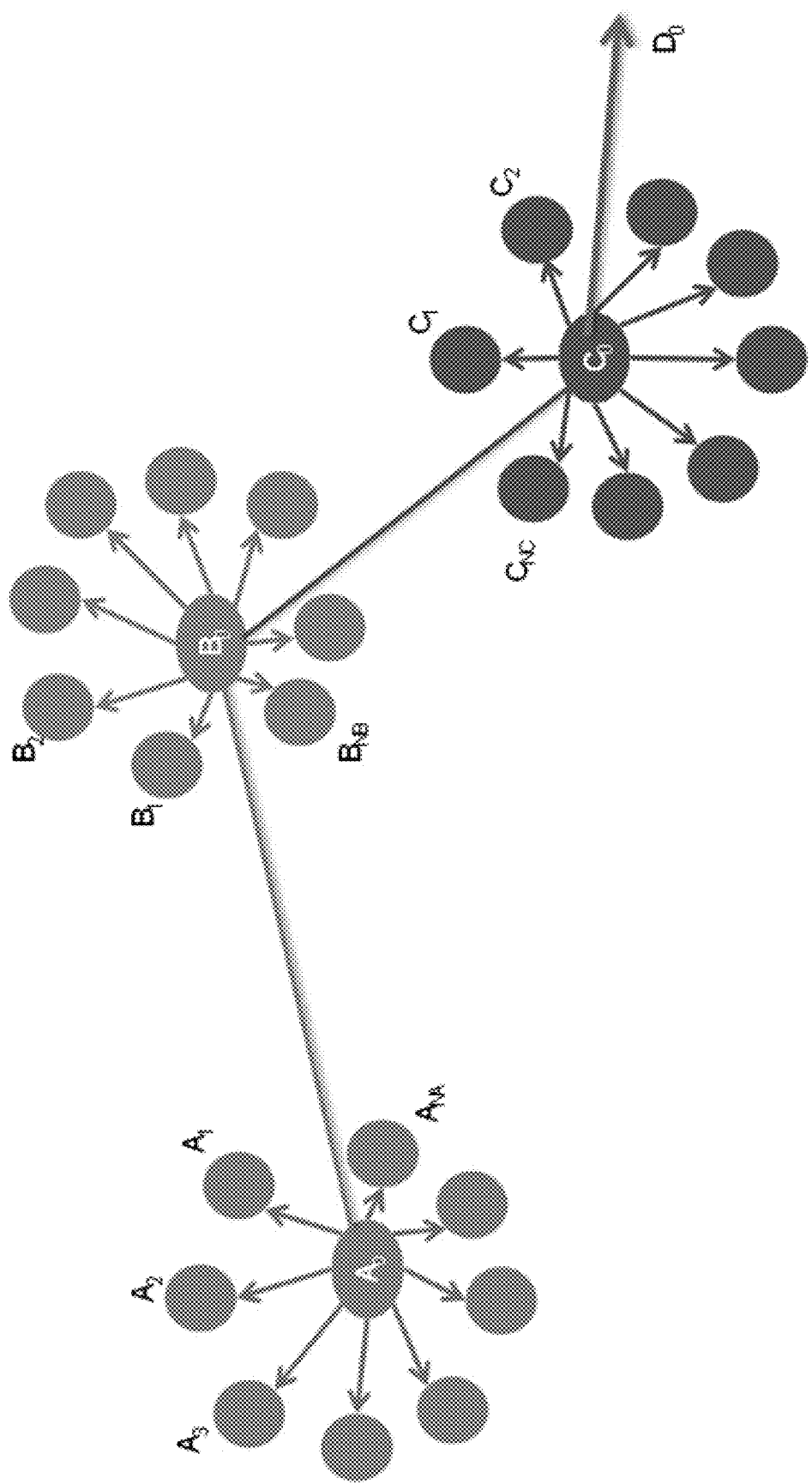
FIG. 8 shows a message originating from Person A0, spreading to persons A1, A2, . . . , A(NA).

FIG. 7: A typical message spreading flow: a message generated by person a, spreading to locality A1, A2 and A3 subsequently, distributed again by person b to locality B1, spreading to locality B2 and B3 and reaching person c, consequently spreading to localities C1, C2 and C3.

FIG. 2: A message originating from Person A0, spreading to persons A1, A2, . . . , ANA; then skipping to Person B0 in a different colony, spreading to persons B1, B2, . . . , BNB; then skipping to Person C0 in a different colony, spreading to persons C1, C2, . . . , CNC; then skipping to Person D0 in a different colony, and so on.

Design.

1. If an author composes a content, the content is broadcasted to every user who's interested to ensure maximum exposure, 2. if a user is receiving a content, only interesting content is delivered to that user, 3. Users' preferences and interest might change by time, the system is able to track those changes.

4. Given a content, ci, the recommendation engine identifies all the users in the system who are likely to find this content enjoyable.

5. The objective of the recommendation engine is to maximize its recommendation accuracy, $\Omega$, a real number between [0,1], so that:

$$\Omega = \Sigma_{i\mu_i/N} = 1.$$

where i=1, 2, . . . , N,

N is the number of users who are exposed to given content, $C_i$, $\mu_i$ is reaction of user i for content $C_i$ so that:

$\mu_i=1$ if user i indicates he or she likes content $C_i$.

$\mu_i=0$ if user i indicates he or she dislikes content $C_i$.

Content Filtering

Given the selectivity in perception of each individual, a given content may or may not be of interest for everyone included in an author's colony. Based on the previous spread/ignore pattern of a given person, the CSE characterizes and quantifies each individual's interest range. When a content is to be spread, for each content the CSE determines a set of target receivers. The users who get the content are given several options to provide feedback such as:

Option 1: Spread (or Like) this content further (interesting content).

Option 2: Kill (or Dislike) this content (do not spread).

Option 3: The user does not care about this content at all.

Option 4: Edit and spread this content (mutation).

The options can be selected by pressing a software button or a similar voting gesture.

By continuously recording the user's spread/kill/ignore reaction to contents, the CSE learns the user behavior and his/her interest range. The algorithm forms two main groups: clusters of user groups and clusters of content groups. Based on the modeled interest, the algorithm maps these two main groups. In an alternative implementation, spread may be substituted or replaced with "like." And kill maybe substituted or replaced by "dislike."

In an implementation, the user can give their reaction to a particular content by using a spread, kill, or ignore indication, or any combination of these. This can be done, for example, by selecting a button for spread, kill, or ignore. The user will use spread to indicate agreement or approval of content, kill to indicate disagreement or disapproval of content, and ignore to indicate to a preference not to take notice of such content.

In other implementations, other words or buttons may be used for similar concepts, such as like (or thumbs up or happy face) being used instead of spread, dislike (or thumbs down or unhappy face or red face) being used instead of kill, and do not show such content in future instead of ignore.

An implementation may include spread, kill, or ignore in any combination. For example, the system can have only spread or like. The system can have only spread (or like) and ignore. The system can have only spread (or like) and kill. The system can consider a user not indicating spread (or like) as indicating a kill (or dislike).

A new content is first spread to users that algorithm identifies as "likely to respond users." If these users chose to spread (or like) this new content, then the algorithm constantly searches for other users who might spread this content as well. If the set of "likely to respond users" chose to kill (or dislike) this new content, then the algorithm first tries to deliver this content to other users, if they do not choose to spread (or like) either, determines the content is perhaps uninteresting to anyone and stops spreading.

Spreading Power of Authors (Influence Region)

We first form clusters of users as described in the combined patent application, "System and Method for Identification and Introduction of Like-Minded Users" and "System and method for Forming Colonies of Users Based on Their Preferences."

For each cluster, we identify viral contents. The definition of a viral (highly popular) content is determined by using the "spreading power" or "liking power" definition included below.

We select viral contents from various clusters to offer a diverse variety of types of contents, such as sports, music, news, and so forth.

We update this list frequently to ensure up to date contents (freshness). We present these contents to new users to gauge their taste and add them to one of the clusters.

Each author has a unique expression style and interest range that contribute significantly to his or her spreading (or liking) power. In fact, it is possible for the same content to have a completely different reach when it is expressed by two different persons. Depending on the person's previous spreading (or liking) history, the algorithm assigns a unique spreading (or liking) power and uses this parameter for its spreading (or liking) function.

Spreading (or liking) power (SP): A real number that captures the spreading (or liking) power of content Ci. SP is a real number between [−1, 1]; values [0 1] indicating the content is spreading (or liking) well, values [−1 0] indicating the content is dying.

For example FIGS. 14A-14B show the implementation of freshness factor.

Definition $$SP=[(W_sS-W_kK)(S-K)(W_cC+W_lL]/[(W_sS\ W_kK)+|S-K|(W_cC+W_lL)],$$

if T>0.
=1.0 otherwise.
where, $W_s$: weight for spread (or like) (say 10).
$W_k$: weight for kill (or dislike) (say 10).
$W_c$: weight for comment (say 5).
$W_l$: weight for comment likes (say 1).
Comment Count (CC): Total number of comments for $C_i$.
Total Like Count (L): Sum of all likes for comments for content $C_i$.

Content Reach

Based on the content characteristics the number of people it spreads will vary. The primary driver of content spread is the content of the content and author's publicity. Another driver is the environment where the content circulates. Typically contents passed within tight and trusted networks have less reach but greater impact than those circulated through dispersed communities.

Content Characteristics

Contents have several attributes that may be used for clustering. Some of them are content indicator, content category, generator's identity, environmental variables (such as geographic region, current events, local culture). Some examples for categories are: News, Gossip, Rumors, Secrets, and so forth.

Furthermore, content processing techniques such as Natural Language Processing, video and image processing, keyword detection are utilized for clustering.

This content can be spread (or liked) by using a known identity (such as Facebook, Google+, Twitter username) user's actual name or a nickname. Nicknames allow users to author and react to contents anonymously.

Spreading Function

This is the main outcome of the algorithm that governs its content spreading (or liking) behavior. The algorithm orders users based on users' previous responds such as kill/spread/ignore actions for each given content and distributes the content to most likely to respond users as well as "test" users. The test group can be used for new users as well as users who have changed their opinions or tastes.

Figure 9:
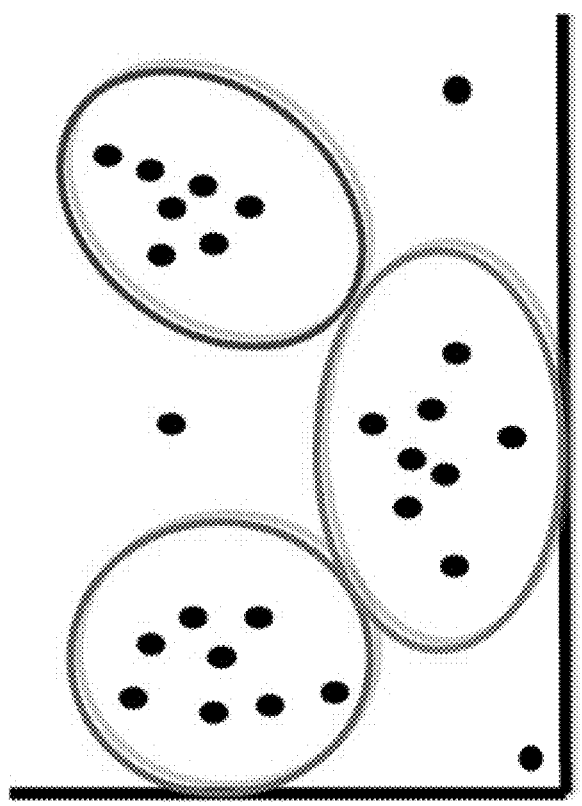
FIG. 9 shows the main outcome of the algorithm that governs its content spreading behavior.

FIG. 9 shows the main outcome of the algorithm that governs its content spreading (or liking) behavior.

2. The User Characterization Method.

The system uses a specifically generated initial fresh user content (IFUC) queue, whose entries are contents that:
are belong to different categories.
are proven to be popular initially.
have enough number of contents to make it statistically significant.
are kept up to date by periodic updates.

The IFUC queue is formed by following recently popular social utilities and by scraping popular content from them. The categories are designed to cover a large spectrum of choices.

Virtual personas (also called avatars) are generated to fetch content from external and popular sources so that a typical user would feel the injected content is coming from other system users.

When a fresh new user signs up to the system, he or she is exposed to, for example, 100 various contents to characterize his/her taste. Based on the results the new user is placed in one of the Colonies.

The IFUC is designed such that it uses minimal initial information without question/answer type of interview process to "naturally" and seamlessly classifies the new user and places him/her in a colony.

We handle the cold start problem by adopting a hybrid approach between content-based filtering and collaborative filtering. New contents (messages) that have not yet received any ratings from the users are assigned a rating automatically, based on the ratings assigned by the users to other similar messages. Content similarity is determined according to the message's content characteristics.

The construction of the user's profile may be automated by integrating information from other user activities, such as browsing histories. If, for example, a user has been interested in a particular music artist previously, then the recommender system would automatically propose that artist's releases when the user requests a new recommendation.

Assigning a new user to one of the previously formed colonies is done by calculating the distance between responses to IFUC and representative (such as average) response of each colony. Such calculation can be done by the exact Euclidian distance, k-means distance or a specific distance measure.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a social graph, wherein the social graph comprises:
a first type of node, referred to as a user-provided node;
a first type of edge, referred to as a user-provided edge; and
a second type of edge, referred to as a system-provided edge;
using at least one electronic processor, managing a social graph comprising:
creating a user-provided node for each user of a system comprising the social graph;
allowing a first user-provided node for a first user to become coupled to a second user-provided node for a second user via a first user-provided edge;
providing a third user-provided node for a third user;
monitoring first content contributed by the first user-provided node, second content contributed by the second user-provided node, and third content contributed by the third user-provided node in an online social platform represented by the social graph;
monitoring first feedback by others to the first content contributed by the first user-provided node, monitoring second feedback by others to the second content contributed by the second user-provided node, and monitoring third feedback by others to the third content contributed by the third user-provided node;

from the monitored first content and first feedback by others to the first user-provided node, generating a first rating vector for the first user-provided node;

from the monitored second content and second feedback by others for the second user-provided node, generating a second rating vector for the second user-provided node;

from the monitored third content and the third feedback by others for the third user-provided node, generating a third rating vector for the third user-provided node;

determining a first similarity factor between the first user-provided node and the third user-provided node, wherein the determination comprises a computation of a cosine of the first rating vector and the third rating vector;

determining a second similarity factor between the second user-provided node and the third user-provided node, wherein the determination comprises a computation of a cosine of the second rating vector and the third rating vector;

based on the first similarity factor, coupling the first user-provided node to the third user-provided node via a first system-provided edge, wherein the first user and third user are members of a first colony group of the social graph;

based on the second similarity factor, not coupling the second user-provided node to the third user-provided node via a system-provided edge, wherein the third user is not a member of the first colony group of the social graph;

creating a new user-provided node for a new user of a system comprising the social graph, wherein the new user-provided node is not coupled to any system-provided edges;

delivering a representative content for the first colony group and monitoring a reaction of the new user to the representative content;

when the reaction is positive, determining the new user-provided node should belong to the first colony group; and adding the new user-provided node to the first colony group by connecting the new user-provided node by a system-provided edge to other user-provided nodes already in the first colony group.

2. The method of claim 1 wherein via the first user-provided edge, the first user-provided node is separated by one degree of separation from the second user-provided node.

3. The method of claim 1 wherein the managing the social graph comprises:
allowing the second user-provided node to become coupled to a fourth user-provided node for a fourth user via a second user-provided edge, wherein via the second user-provided edge, the first user-provided node is separated by two degrees of separation from the fourth user-provided node.

4. The method of claim 1 comprising:
delivering a first informational content to the first colony group of the social graph, wherein the first colony group comprises user-provided nodes coupled together via the first system-provided edge, which includes the first and third user-provided nodes and new user-provided node.

5. The method of claim 4 comprising:
disallowing delivering of the first informational content to the second user-provided node, which is not coupled to the first system-provided edge.

6. The method of claim 1 wherein the managing the social graph comprises:
allowing the second user-provided node to become coupled to a fourth user-provided node for a fourth user via a second system-provided edge.

7. The method of claim 6 comprising:
delivering a first informational content to a first colony group of the social graph, wherein the first colony group comprises user-provided nodes coupled together via the first system-provided edge, which includes the first and third user-provided nodes; and
delivering a second informational content to a second colony group of the social graph, wherein the second colony group comprises user-provided nodes coupled together via the second system-provided edge, which includes the second and fourth user-provided nodes.

8. The method of claim 7 wherein the first informational content is not delivered to the fourth user-provided node, and the second informational content is not delivered to the third user-provided node.

9. The method of claim 1 wherein the system creates the first user-provided edge because the first user indicated a connection to the second user.

10. The method of claim 1 wherein the system creates the first system-provided edge although the first user had not indicated any connection to the third user.

11. The method of claim 9 wherein the system creates the first system-provided edge although the first user had not indicated any connection to the third user.

12. The method of claim 1 comprising:
determining the new user-provided node in the first colony group should no longer belong to the first colony group; and
removing the new user-provided node from the first colony group by removing system-provided edges representative of the first colony group from connecting to the new user-provided node that is to be removed.

13. A system comprising:
a first mobile device, wherein the first mobile device comprises a touchscreen and a wireless transceiver;
a software application program, comprising code executable on a processor of the first mobile device, wherein the software application program comprises:
code to cause the wireless transceiver to connect and access to a social network, wherein the social network comprises:
a first type of node, referred to as a user-provided node,
a first type of edge, referred to as a user-provided edge; and
a second type of edge, referred to as a system-provided edge, and the social network is managed comprising:
creating a user-provided node for each user of a system comprising the social graph;
allowing a first user-provided node for a first user to become coupled to a second user-provided node for a second user via a first user-provided edge;
providing a third user-provided node for a third user;
monitoring first content contributed by the first user-provided node, second content contributed by the second user-provided node, and third content contributed by the third user-provided node in an online social platform represented by the social graph;
monitoring first feedback by others to the first content contributed by the first user-provided node, monitoring second feedback by others to the second content contributed by the second user-provided node, and monitoring third feedback by others to the third content contributed by the third user-provided node;

from the monitored first content and first feedback by others to the first user-provided node, generating a first rating vector for the first user-provided node;

from the monitored second content and second feedback by others for the second user-provided node, generating a second rating vector for the second user-provided node;

from the monitored third content and the third feedback by others for the third user-provided node, generating a third rating vector for the third user-provided node;

determining a first similarity factor between the first user-provided node and the third user-provided node, wherein the determination comprises a computation of a cosine of the first rating vector and the third rating vector;

determining a second similarity factor between the second user-provided node and the third user-provided node, wherein the determination comprises a computation of a cosine of the second rating vector and the third rating vector;

based on the first similarity factor, coupling the first user-provided node to the third user-provided node via a first system-provided edge, wherein the first user and third user are members of a first colony group of the social graph;

based on the second similarity factor, not coupling the second user-provided node to the third user-provided node via a system-provided edge, wherein the third user is not a member of the first colony group of the social graph;

creating a new user-provided node for a new user of a system comprising the social graph, wherein the new user-provided node is not coupled to any system-provided edges;

delivering a representative content for the first colony group and monitoring a reaction of the new user to the representative content;

when the reaction is positive, determining the new user-provided node should belong to the first colony group; and adding the new user-provided node to the first colony group by connecting the new user-provided node by a system-provided edge to other user-provided nodes already in the first colony group;

code to generate a first touch interactive screen for a first user of the first mobile device comprising a picture of a second user of a social network, wherein the second user is coupled to the first user via a user-provided edge;

code to generate a second touch interactive screen for the first user of the first mobile device comprising a picture of a third user of a social network, wherein the third user is coupled to the first user via a system-provided edge;

code to generate a third touch interactive screen to allow the first user to select from a list of system-generated ice breaker questions to send to the third user; and code to generate a fourth touch interactive screen to the first user to start a party and invite one or more other users of the social network to the party.

14. The system of claim 13 comprising:

a second mobile device, wherein the second mobile device comprises a touchscreen and a wireless transceiver;

a software application program, comprising code executable on a processor of the second mobile device, wherein the software application program comprises:

code to generate a fifth touch interactive screen for the third user of the second mobile device comprising a first informational content for the first colony group of the social graph, wherein the first colony group comprises user-provided nodes coupled together via the first system-provided edge, which includes the first and third user-provided nodes.

15. The system of claim 13 wherein the system creates the first system-provided edge although the first user had not indicated any connection to the third user.

16. The system of claim 15 wherein the system creates the first user-provided edge because the first user indicated a connection to the second user.

17. The system of claim 13 wherein the social network is managed comprising:

determining the new user-provided node in the first colony group should no longer belong to the first colony group; and removing the new user-provided node from the first colony group by removing system-provided edges representative of the first colony group from connecting to the new user-provided node that is to be removed.

* * * * *